(12) United States Patent
Armstrong

(10) Patent No.: US 10,117,389 B2
(45) Date of Patent: Nov. 6, 2018

(54) AGRICULTURAL GROWING STRUCTURE

(71) Applicant: Danny A. Armstrong, Payson, AZ (US)

(72) Inventor: Danny A. Armstrong, Payson, AZ (US)

( * ) Notice: Subject to any disclaimer, the term of this patent is extended or adjusted under 35 U.S.C. 154(b) by 68 days.

(21) Appl. No.: 15/162,590

(22) Filed: May 23, 2016

(65) Prior Publication Data

US 2017/0035010 A1    Feb. 9, 2017

Related U.S. Application Data

(60) Provisional application No. 62/165,947, filed on May 23, 2015.

(51) Int. Cl.
*A01G 31/00* (2018.01)
*A01G 31/06* (2006.01)
*A01G 9/029* (2018.01)

(52) U.S. Cl.
CPC .............. *A01G 31/06* (2013.01); *A01G 9/029* (2018.02); *A01G 2031/006* (2013.01); *Y02P 60/216* (2015.11)

(58) Field of Classification Search
CPC ...... A01G 31/06; A01G 31/00; A01G 31/001; A01G 31/02; A01G 31/04; A01G 31/042; A01G 9/10; A01G 2031/006; A01G 9/104; A01G 9/1066; A01G 9/022; A01G 9/023
See application file for complete search history.

(56) References Cited

U.S. PATENT DOCUMENTS

| | | | | |
|---|---|---|---|---|
| 4,028,847 A * | 6/1977 | Davis | ................. | A01G 31/042 165/59 |
| 4,312,152 A * | 1/1982 | Drury | ................. | A01G 31/02 47/62 R |
| 6,233,870 B1 * | 5/2001 | Horibata | ................. | A01G 31/02 47/59 R |
| 7,080,482 B1 * | 7/2006 | Bradley | ................. | A01G 31/02 47/60 |

(Continued)

*Primary Examiner* — Trinh T Nguyen
(74) *Attorney, Agent, or Firm* — Roy A. Ekstrand

(57) ABSTRACT

A generally planar foundation pad is formed of a material such as concrete, or the like, and supports a framework defining a plurality of concentric circular paths stacked in a cylindrical array. A plurality of helical water troughs are supported by the framework within each of the circular paths. Water circulation apparatus is provided which pumps water from the bottom of each helical water trough to the top and selected intermediate portions of the water trough to produce a continuous circulation of water. The circulating water is combined with various nutrients and the nutrient and water solution is filtered as it is circulated. Each helical water trough is formed of multiple vertically stacked layers of the trough. As a result, a great length of water trough is stacked upon a small footprint of land. Each water trough is filled with a plurality of floating growing trays to form a continuous "train" of growing trays extending down the entire water trough. As the water and nutrient solution flows down each helical water trough, the floating growing trays are carried down the water trough. As the growing trays move, they are continuously removed from the bottom end of the water trough and added at the top.

12 Claims, 17 Drawing Sheets

(56) References Cited

U.S. PATENT DOCUMENTS

| | | | | |
|---|---|---|---|---|
| 8,677,942 B2* | 3/2014 | Bodlovich | ............... | C02F 3/32 |
| | | | | 119/226 |
| 8,889,006 B2* | 11/2014 | Lassovsky | .............. | C02F 3/327 |
| | | | | 210/150 |
| 8,959,834 B2* | 2/2015 | Hashimoto | ............ | A01G 9/025 |
| | | | | 47/63 |
| 2006/0201058 A1* | 9/2006 | Ripatti | ................ | A01G 31/042 |
| | | | | 47/1.1 |
| 2011/0067301 A1* | 3/2011 | DeMitchell | ............ | A01G 31/02 |
| | | | | 47/62 C |
| 2014/0083007 A1* | 3/2014 | Galvan | ................. | A01G 31/02 |
| | | | | 47/62 A |
| 2015/0068121 A1* | 3/2015 | Probst | ................... | A01G 31/06 |
| | | | | 47/59 R |

* cited by examiner

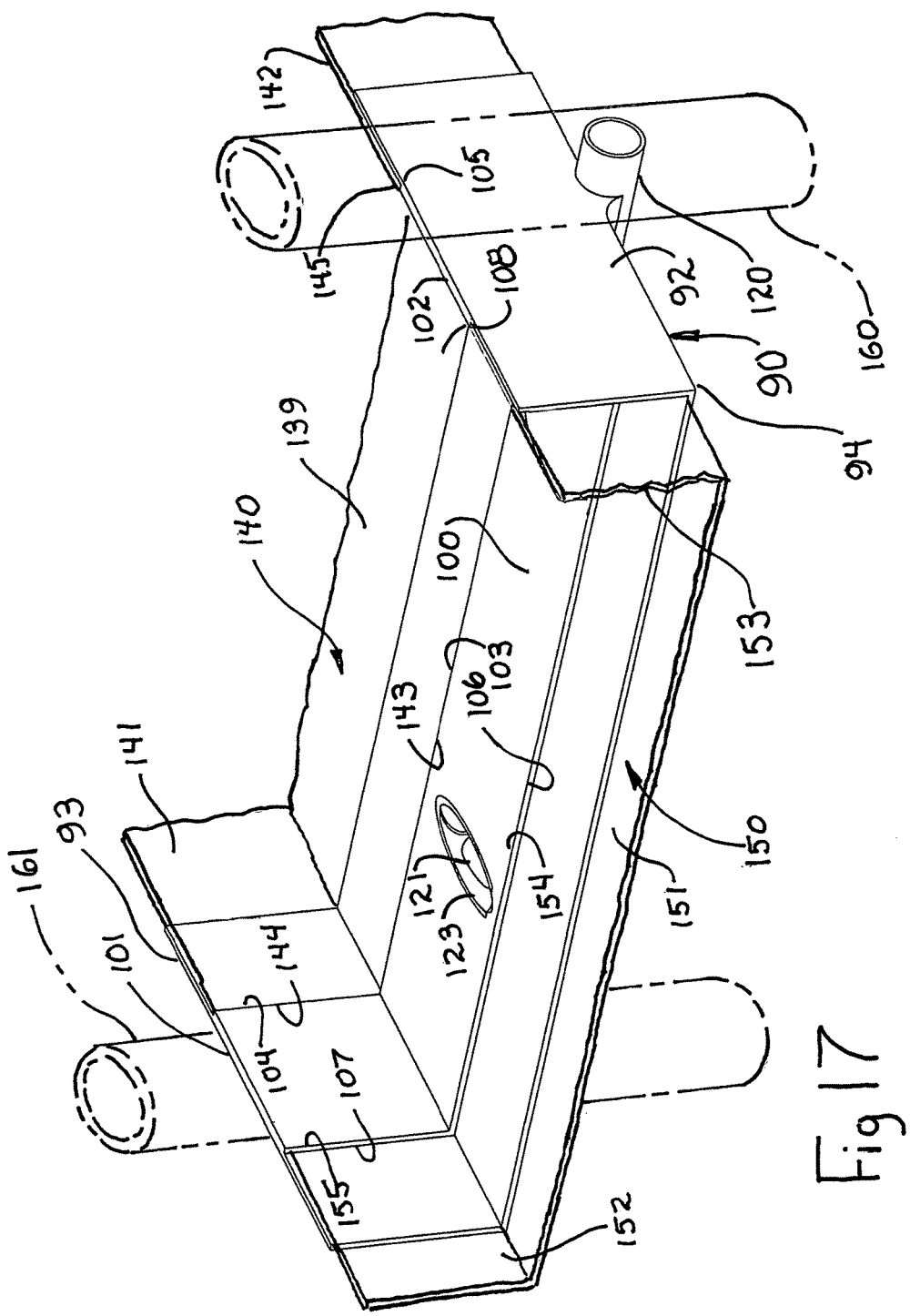

AGRICULTURAL GROWING STRUCTURE

CROSS REFERENCE TO RELATED APPLICATION

This application claims the benefit o and priority under 35 U.S.C. 119(e) of U.S. Provisional Patent Application No. 62/165,947, filed May 23, 2015 on behalf of Danny A. Armstrong and entitled AGRICULTURAL GROWING STRUCTURE the disclosure of which is incorporated herein by reference.

FIELD OF THE INVENTION

This invention relates generally to agricultural systems and particularly to hydroponic growing systems.

BACKGROUND OF THE INVENTION

Traditional agriculture has, for centuries been carried forward on plots of land, typically referred to as "farms". Farms have been utilized in a virtually endless variety of climates, geographical locales, sizes and circumstances. As populations increased and non-farming land use increased, reduced amounts of agricultural land have been available. In many areas of the world, this reduction of available land for farming has become critical. As the competition for land between agricultural food producers and non-agricultural land users has intensified, agricultural food producers have struggled to supply food to ever increasing populations using less and less land. This pressure has lead many food producers to explore non-tradition methods of farming. One promising alternative to traditional farming methods is found in hydroponics. Hydroponics is basically a system of agriculture which involves growing plants in a water and nutrient mixture without the use of soil. While a number of different hydroponic systems have been developed, typically all utilize an absorbent growing medium that supports seeds and growing plants such that the plant roots extend into a nutrient-rich water solution.

While hydroponic systems were received initially as bearing great promise, development of efficient cost-effective and practical agriculture has eluded practitioners in the agricultural arts. Hydroponic systems have, for the most part, proven to be costly and complex structures that still require substantially the same extensive land areas as traditional farming. In addition, the complex structures required to grow large crops in a manner that is cost competitive with traditional farming has not been attained. There remains therefore a continuing and unresolved need in the art for a system of agriculture that effectively and efficiently addresses the critical shortage of farm land throughout the world. There remains a continuing and unresolved need in the agricultural arts for a system of agriculture that is capable of growing greater crops for given area of land.

SUMMARY OF THE INVENTION

Accordingly, it is a general object of the present invention to provide an improved agricultural growing system. It is a more particular object of the present invention to provide an improved agricultural growing system that more efficiently uses a given area of land. It is a still more particular object of the present invention to provide an improved agricultural growing system that more efficiently uses a given a of land that makes effective use of hydroponic technology.

The present invention agricultural growing structure provides a generally planar foundation pad formed of a material such as concrete or the like, which supports a framework defining a plurality of concentric circular paths stacked in a cylindrical array. A plurality of helical water troughs are supported by the framework within each of the circular paths. Water circulation apparatus is provided which pumps water from the bottom of each helical water trough to the top and selected intermediate portions of the water trough to produce a continuous circulation of water. The circulating water is combined with various nutrients and the nutrient and water solution is filtered as it is circulated. Each helical water trough is formed of multiple vertically stacked layers of the trough. As a result, a great length of water trough is stacked upon a small footprint of land. Each water trough is filled with a plurality of floating growing trays to form a continuous "train" of growing trays extending down the entire water trough. As the water and nutrient solution flows down each helical water trough, the floating growing trays are carried down the water trough. As the growing trays move they are continuously removed from the bottom end of the water trough and added at the top.

Within each growing tray, a growing medium is provided which cooperates with slots formed in the tray bottom to maintain a wet environment within the growing tray. A quantity of seeds are placed in and on the growing medium prior to adding each growing tray at the top of the water trough. During the time that the growing tray travels from the top of the water trough to the bottom end, the seeds germinate and the germinated plants grow to maturity. As the growing trays bearing mature plants reach the bottom end of the water trough, the trays are removed and the plants are harvested. The growing trays are then emptied, cleaned restocked and reseeded for return to the top of the water trough and the cycle continues.

In the preferred embodiment of the invention, a plurality of concentric helical water troughs are arranged upon the support structure to make maximum efficient use of the supporting land. Additionally, a plurality of water level sensors are situated along each rater trough which, in turn, are coupled to the water circulation system to allow water to be added to or removed from selected portions of the water trough in order to ensure a proper water level throughout the system. While some use is made of ambient sunlight in the growing process, the use of concentric of helical water troughs in close arrangement may be accommodated by providing artificial lights on the undersides of the water troughs. It will be apparent to those skilled in the art that the size of the helical water trough array may selected to suit a particular locale or need. It will be equally apparent to those skilled in the art that substantial variation of parameters of the array may be utilized without departing from the spirit and scope of the present invention.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings in the several figures of which like reference numerals identify like elements and in which:

FIG. 17 sets forth a perspective view of the trough junction support shown in FIG. 12 having air of trough sections coupled thereto.

DESCRIPTION OF THE PREFERRED EMBODIMENTS

Figure 1:
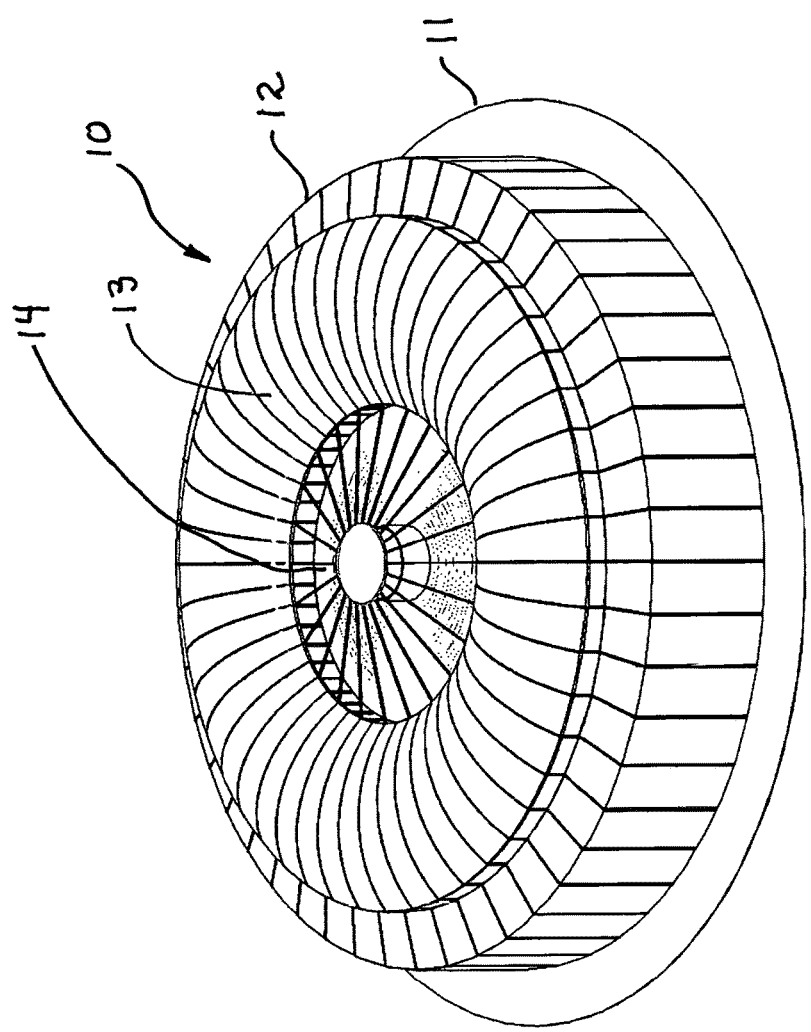
FIG. 1 sets forth a perspective view of an agricultural growing system constructed in accordance with the present invention.

FIG. 1 sets forth a perspective view of an agricultural growing structure constructed in accordance with the present invention and generally referenced by numeral 10. Structure 10 includes a generally cylindrical array of helical water troughs 12 which are supported upon a base 11. Base 11 is preferably fabricated of a high-strength material such as concrete, or the like. As is better seen in FIG. 10, troughs 12 include a plurality of cylindrical helical water troughs concentrically arranged about a center utility area 14. A light transmissive protective roof 13 covers most of trough array 12.

Figure 2:
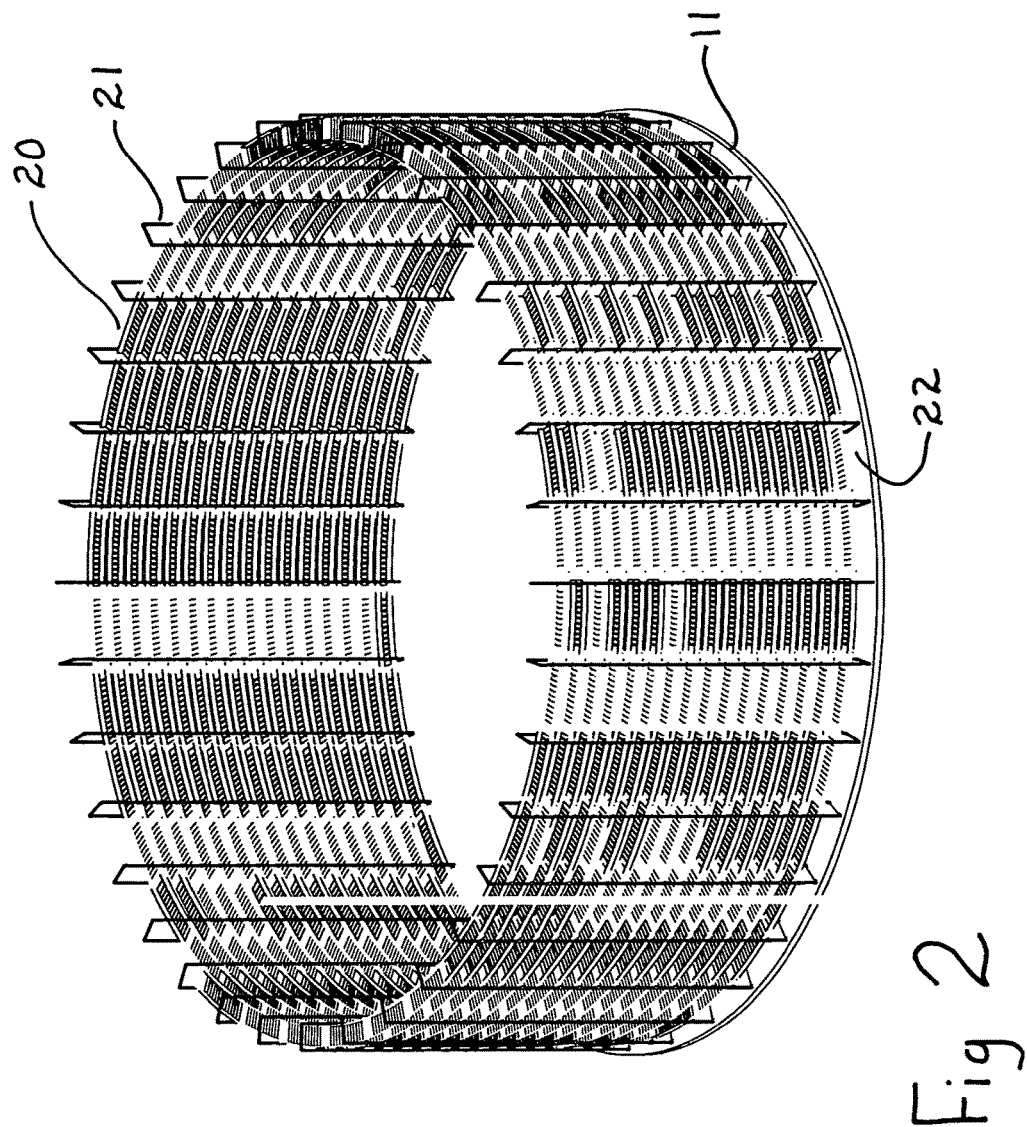
FIG. 2 sets forth a perspective view of a support structure used in an agricultural growing system constructed in accordance with the present invention.

FIG. 2 sets forth a perspective view of a portion of growing structure 10 showing base 11 supporting a plurality of vertically extending frame supports 21. An outer helical water trough 20 is shown supported by frame supports 21. In accordance with the preferred fabrication of the invention, it will be noted that helical water trough 20 is spaced upwardly above base 11 to create a lower space 22. Space 22 provides a utility area beneath the array of water troughs which is used to move equipment such as transport and service trucks as well as maintenance vehicles to and from various portions of the growing structure.

Figure 3:
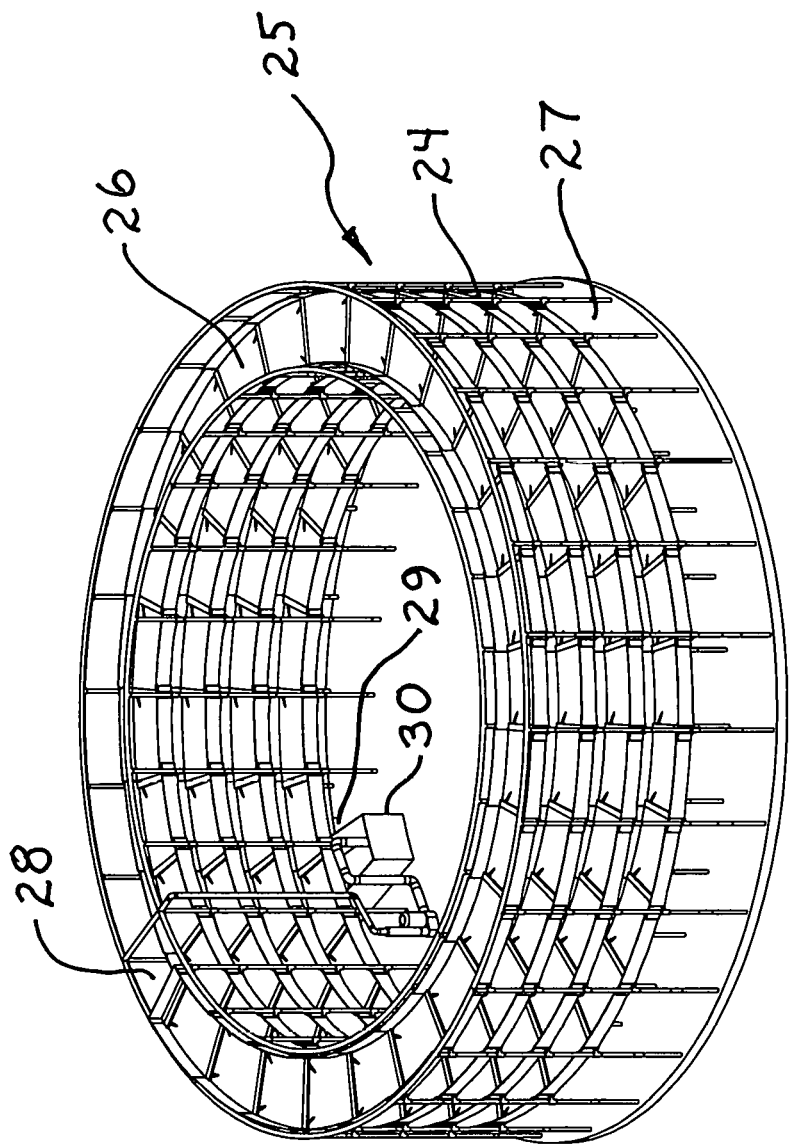
FIG. 3 sets forth a perspective view of a the agricultural growing system constructed in accordance with the present invention configured to grow fodder.

FIG. 3 sets forth a perspective view of a growing structure constructed in accordance with the present invention which is configured to grow fodder for consumption livestock generally referenced by numeral 25. Growing structure 25 includes abase 27 which supports a vertically extending frame 24. Frame 24 is preferably fabricated of a PVC pipe material shown below in FIG. 11. Of importance to note here is the function of supporting frame 24 as a circulation system by which water is added to or removed from helical water trough 26, helical water trough 26 defines a top portion 28 and a bottom portion 29. As described above growing trays, such as those shown in FIG. 6 fill helical water trough 26 and are moved down water trough 26 as water flows downwardly. As is also described above growing trays bearing seed growing medium are added at top 28 as trays bearing mature fodder plants are removed at bottom 29. The mature fodder is then harvested and placed in feed bin 30 for livestock within the interior of base 27 to feed upon. In this manner, structure 25 is "self-contained" in that the livestock within are continuously supplied with fodder produced at bottom 29. While the size of the growing structure may be varied, by way of example, it has been determined that a structure fifty feet in diameter and eighteen feet high will supply fodder sufficient for five hundred cattle.

Figure 4:
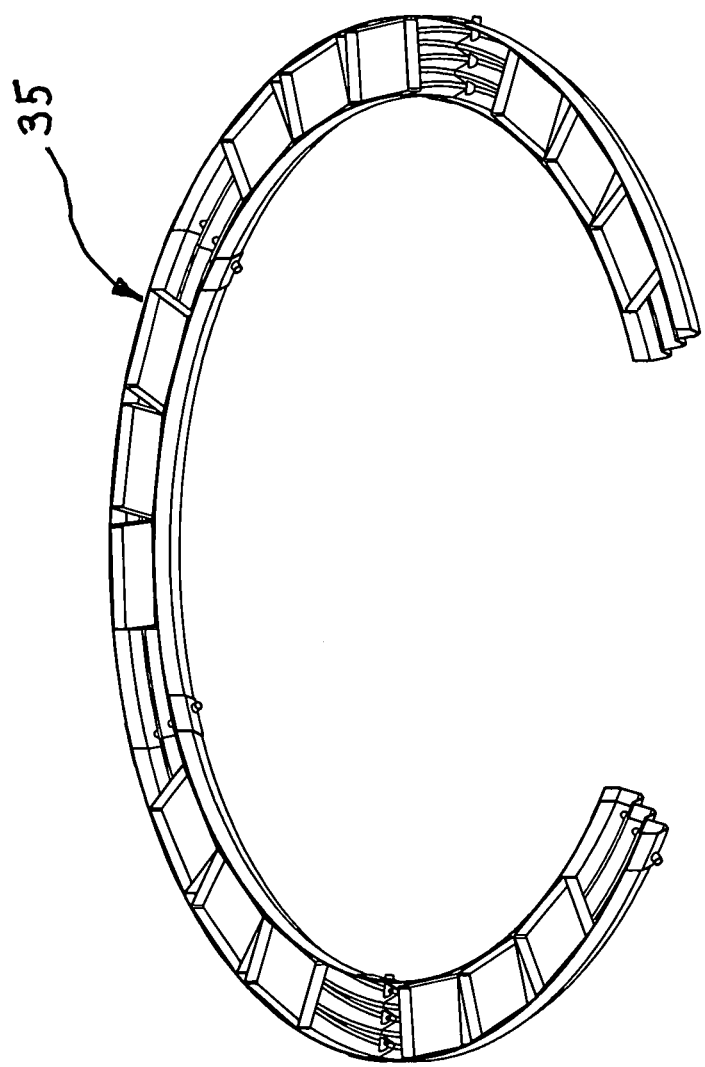
FIG. 4 sets forth a perspective view of an illustrative segment of a helical water trough used in an agricultural growing system constructed in accordance with the present invention.

FIG. 4 sets forth a perspective view of a single "loop" of helical water trough 26 generally referenced by numeral 35. Of importance to note in FIG. 4 is the use of multiple interlocking growing tray segments used.

Figure 5:
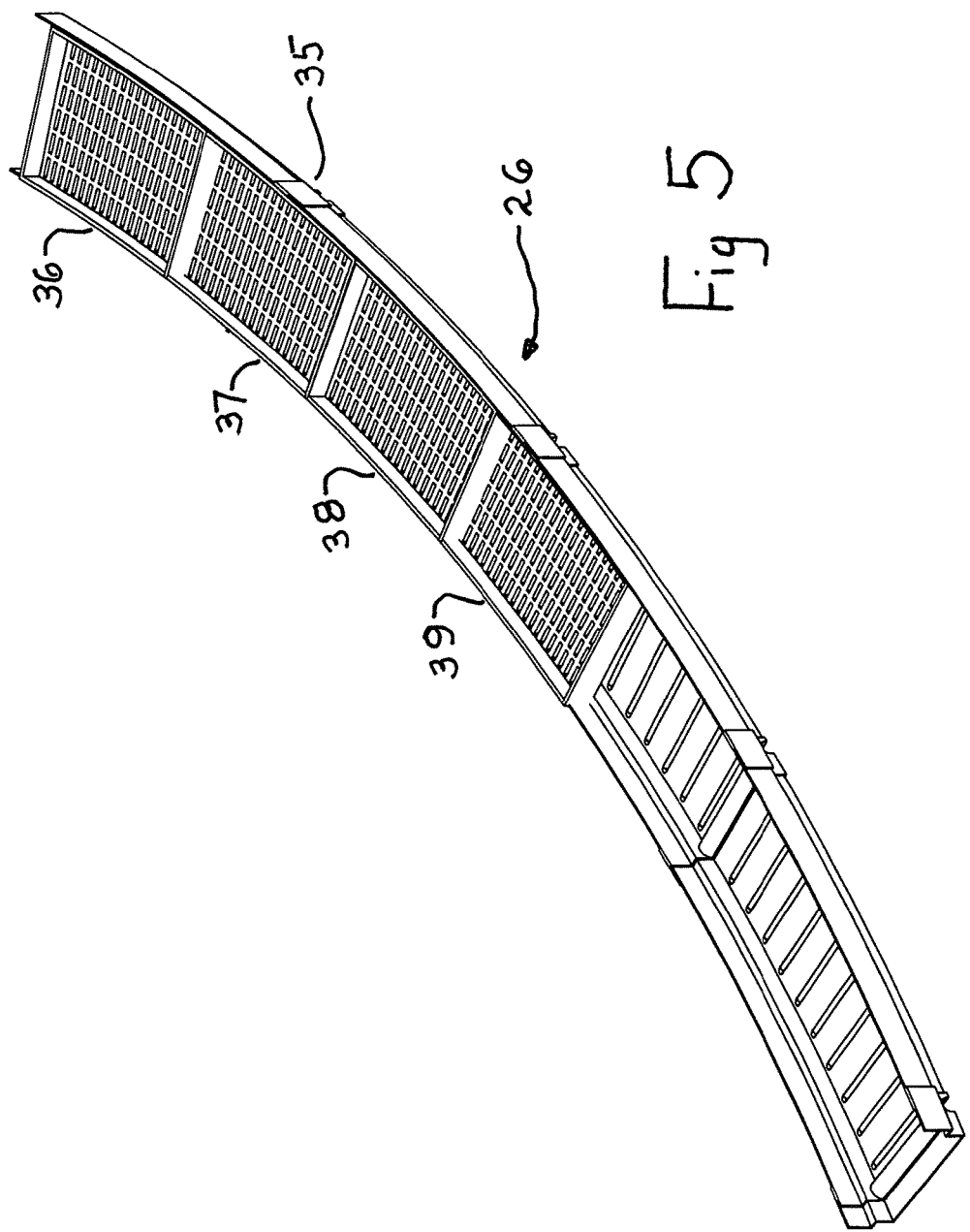
FIG. 5 sets forth a perspective view of an illustrative junction segment of a helical water trough used in an agricultural growing system constructed in accordance with the present invention.

FIG. 5 shows a portion of helical water trough 26 having a plurality of growing trays 36 through 39 floating therein. It will be recalled that during normal use, floating growing trays will fill the entirety of helical water trough 26 end-to-end.

Figure 6:
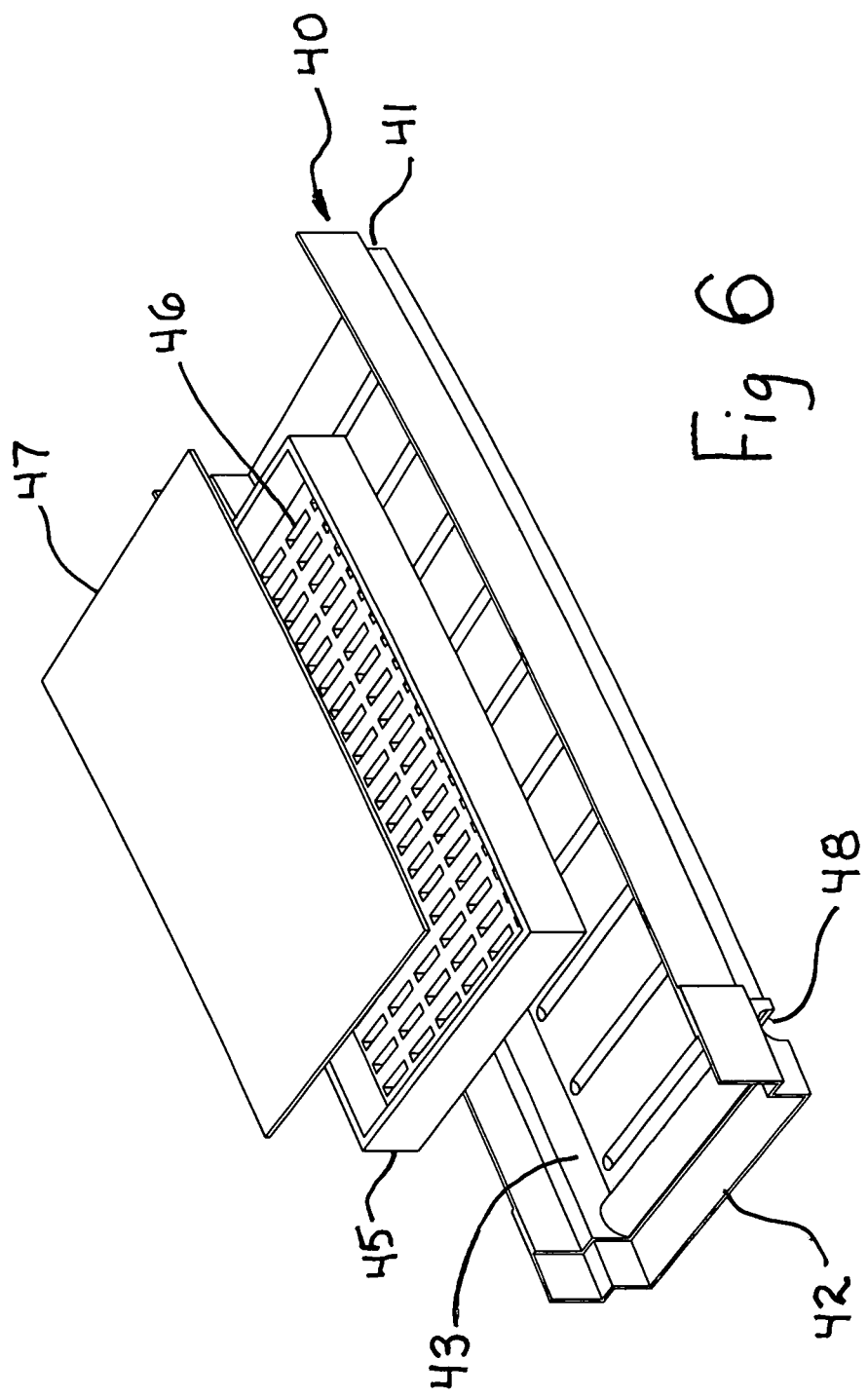
FIG. 6 sets forth a perspective view of an illustrative floating growing tray and growing medium together with a segment of a helical water trough used in an agricultural growing system constructed in accordance with the present invention.

FIG. 6 sets forth a perspective assembly view of an illustrative segment of helical water trough 26 (seen in FIG. 3). In the water trough section shown in FIG. 6 water trough 26 is constructed using a plurality of arcuate segments serially joined in the manner shown in FIGS. 4 and 5. It will be recalled that the helical water troughs of the present invention may also be constructed of elongated, one-piece, unitary troughs in the manner set forth in the above-referenced co-pending application. Returning to FIG. 6, a tray segment 40 defines a water channel 43 and end couplers 41 and 42. End 42 further includes a semi-cylindrical dam 48 which allows end 42 of tray 40 to rest upon and be glued to a pipe frame cross member.

A floating growing tray 45 includes a plurality of transverse water channels and slots 46 which allow water to rise up into the lower portion of tray 45 when the tray is placed within water-filled channel 43 of trough section 40. A Floating growing tray 45 further receives a growing medium 47 which is formed of a soft water absorbent material. In uses such as fodder growth, it may be preferred to form growing medium 57 of an edible fiber material. In operations growing other plants, virtually any suitably absorbent material suitable form seed germination and root penetration may be used.

In operation, a plurality of segments are joined end-to-end using the inter locking ends of each tray to form a helical water trough supported within a supporting frame as shown in FIG. 1, 2 or 3. Each growing tray is added to the top of the helix as described above. A growing medium is seeded and placed within each growing tray. As the trays travel down the helical water trough, water and nutrients are absorbed up through the slots and channels of the tray into the growing medium, during the time required for a tray to travel to the bottom end of the water trough, the seeds germinate, growing plants which mature to fill growth and are harvested as the trays are removed from the bottom end. The growing trays are emptied, cleaned replenished and returned to the top end for reuse.

Figure 7:
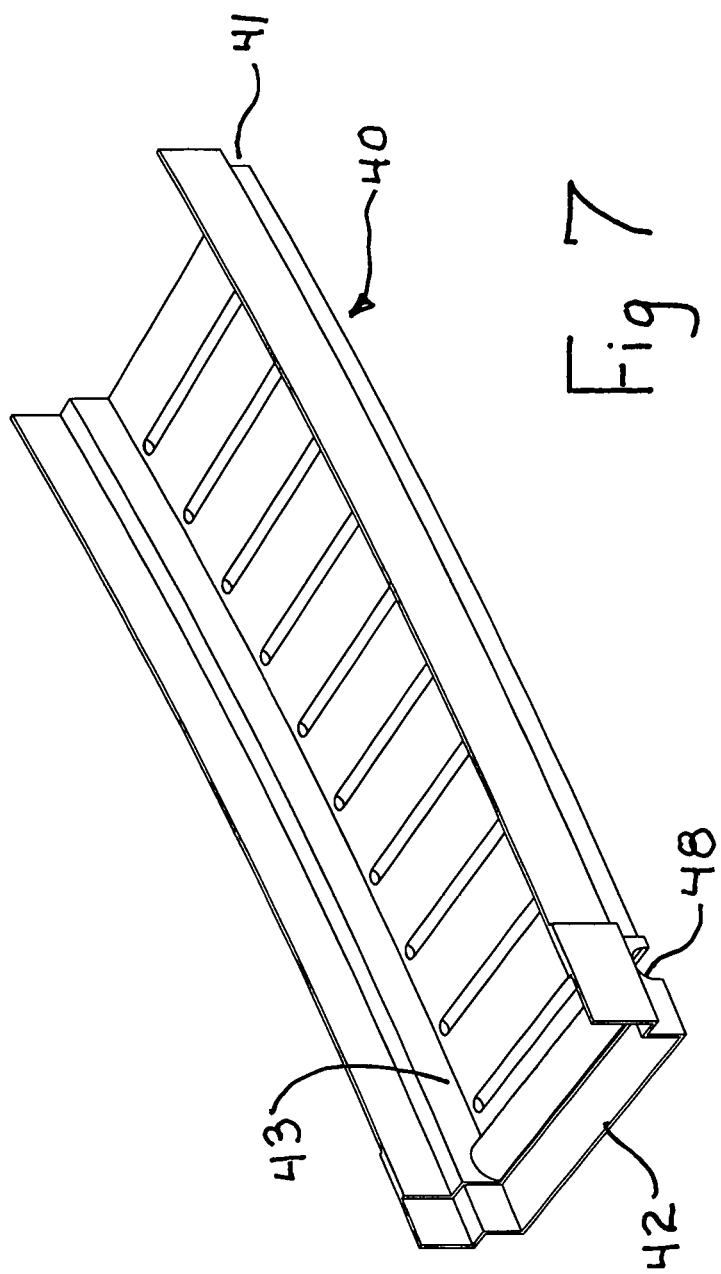
FIG. 7 sets forth a perspective view of an illustrative segment of a water trough used in an agricultural growing system constructed in accordance with the present invention.
Figure 8:
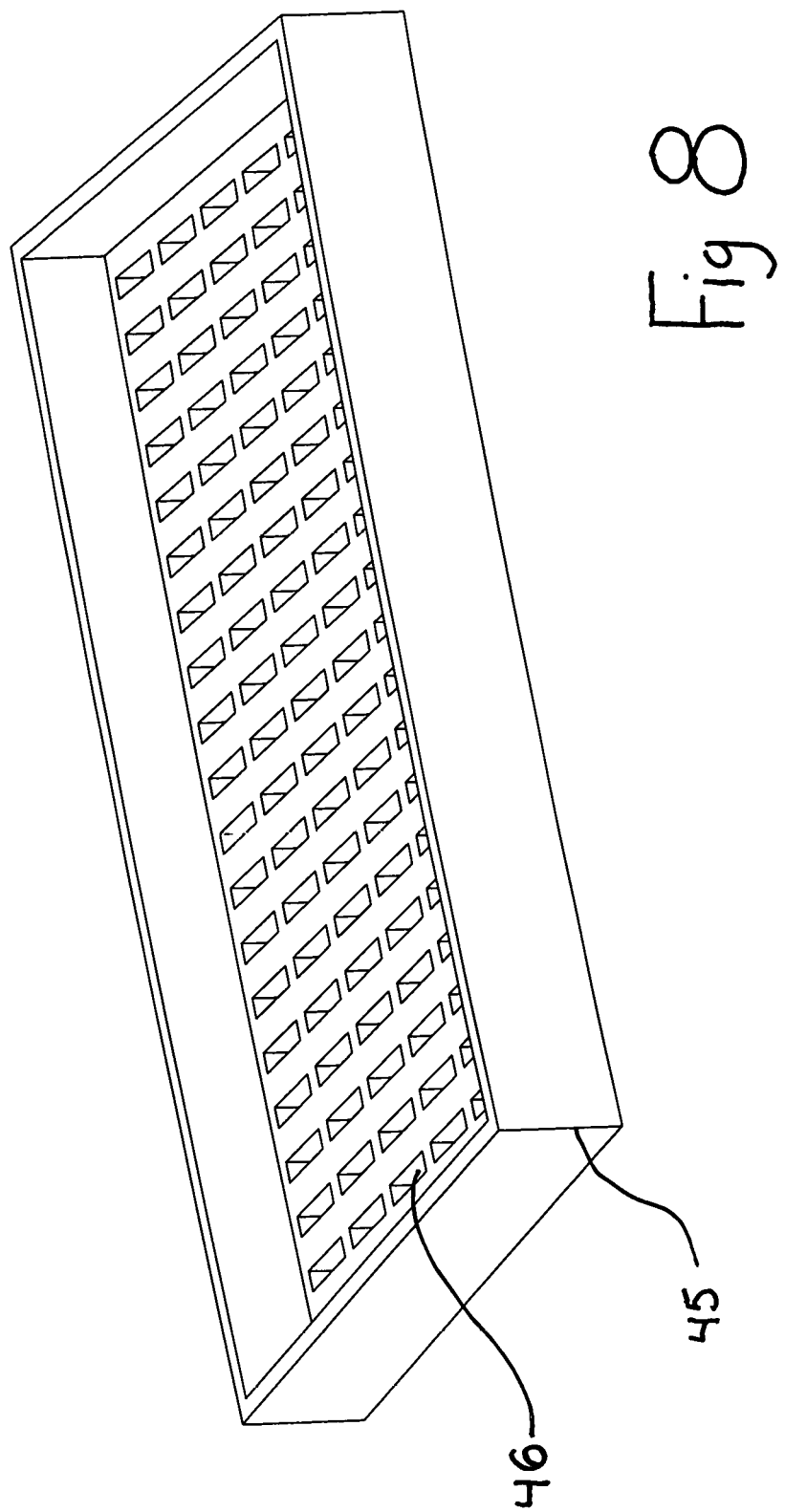
FIG. 8 sets forth a perspective view of an illustrative floating growing tray used in an agricultural growing system constructed in accordance with the present invention.
Figure 9:
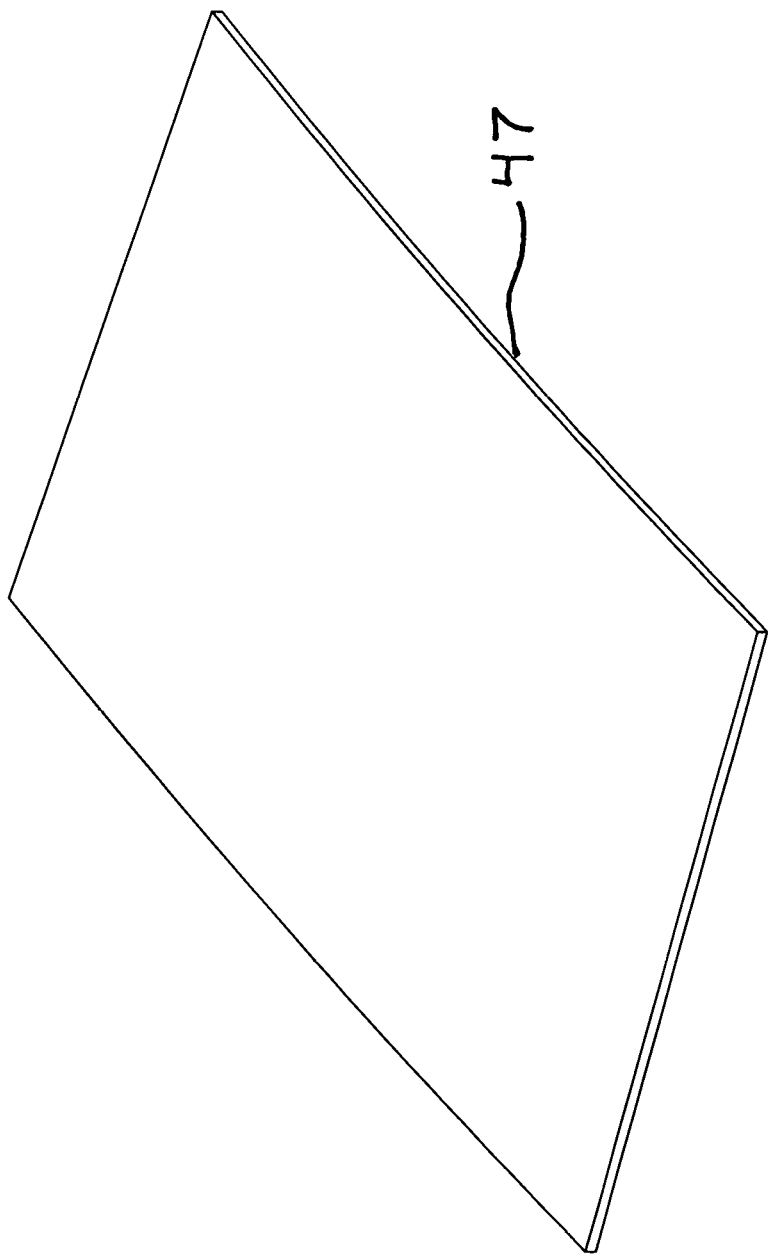
FIG. 9 sets forth a perspective view of an illustrative growing medium used in agricultural growing system constructed in accordance with the invention.

FIGS. 7, 8 and 9 set forth individual perspective views of water trough section 40, floating growing tray 45 and growing medium 47 respectively.

Figure 10:
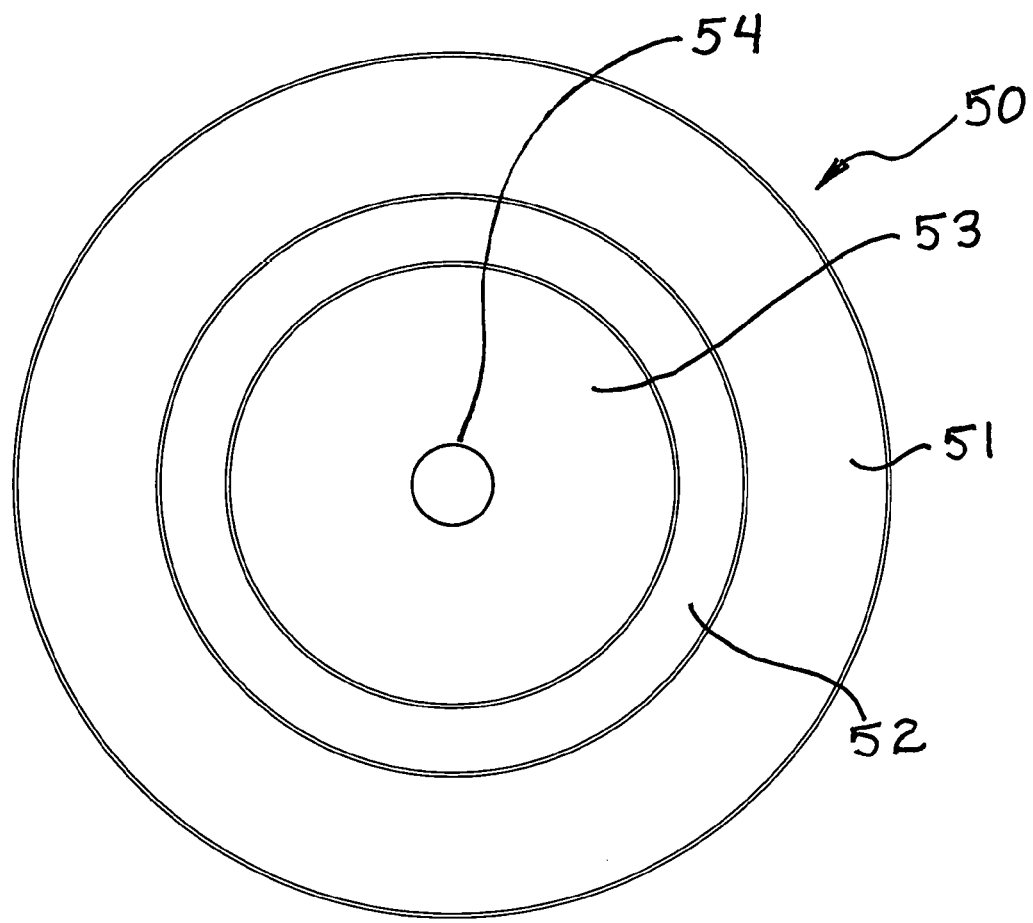
FIG. 10 sets forth a top view of an agricultural growing system constructed in accordance with the present invention.

FIG. 10 sets forth a top view of an illustrative agricultural growing structure constructed in accordance with the present invention and generally referenced by numeral 50. Growing structure 50 is provided solely as an illustrative example of a complete growing structure. It will be apparent to those skilled in the art that a variety of water trough combinations and sizes may be used without departing from the spirit and scope of the present invention. Thus, in the example shown in FIG. 10, an outer water trough 51 is used to grow fodder while an inward water trough 52 is used to grow a different plant. A further inward water trough 53 is used to maturate fish while a utility and service area is provided at the center. The spacing between layers of the helical water troughs is adjusted for each selected use. For example in fodder growth troughs the spacing is between sixteen and eighteen inches. In most other plant growth a four foot spacing is typical. For fish environments a spacing of eight feet is typical. By way of example, a typical rowing structure constructed in accordance with the present invention having a diameter of three hundred thirty feet and an overall height that accommodates six story helical water troughs will provide the growing equivalent of live thousand acres of conventional farmland agriculture.

Figure 11:
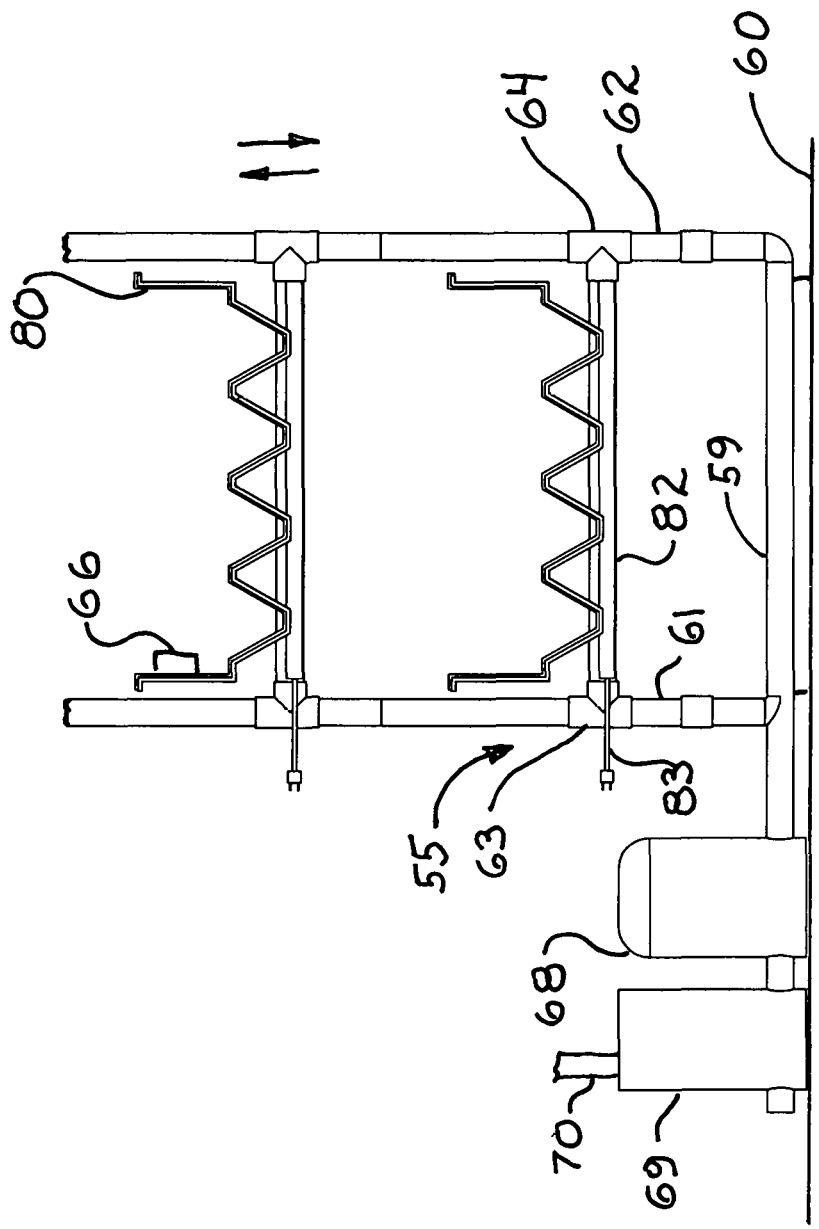
FIG. 11 set forth a partial view of an illustrative support structure used in an agricultural growing system constructed in accordance with the present invention.

FIG. 11 sets forth a partial side elevation view of a supporting frame structure which includes water transporting frame members. While a support structure formed solely of pipe elements may be utilized, it is anticipated that a combination of steel frame and pipe frame structures will likely prove optimum for most uses. The clear advantage of pipe frame structures is found in their ability to circulate water within the helical water troughs.

More specifically, a base 60 preferably formed a material such as concrete provide support for a plurality of vertical structures such as structure 55. Structure 55 includes a horizontal member which, in turn, supports a pair of spaced apart vertical members 61 and 62. A pair of T-couplers 63 and 64 are positioned upon vertical members 61 and 62 respectively. A cross member 67 couples T-couplers 63 and 64. A pump 68 is coupled to a filter 69 which, in turn, is coupled to a water return and supply pipe 70. A trough section 80 includes a dam (see dam 47 in FIG. 6) which receives cross member 67. Dam 81 and cross member 67 define pluralities of apertures which allow water to flow between cross member 67 and trough section 80 to maintain the desired water level within trough section 80 and to provide a water flow that moves floating growing trays such as tray 80. Preferably, dam 81 is glued to cross member 67 to provide a water-tight seal therebetween. The stacked array of helical troughs forming helix 20 requires that artificial light be used or at least available to supplement the natural light which the various agricultural plants require for proper growth. Accordingly, in the preferred fabrication of the present invention a plurality of electric lights are supported on the undersides of the trough sections. By way of example, FIG. 11 shows light 82 supported on the underside of trough section 80 together with an electrical power connecting wires set 83. Wire set 83 will be understood to be coupled to an available source of electric power (not shown).

Figure 12:
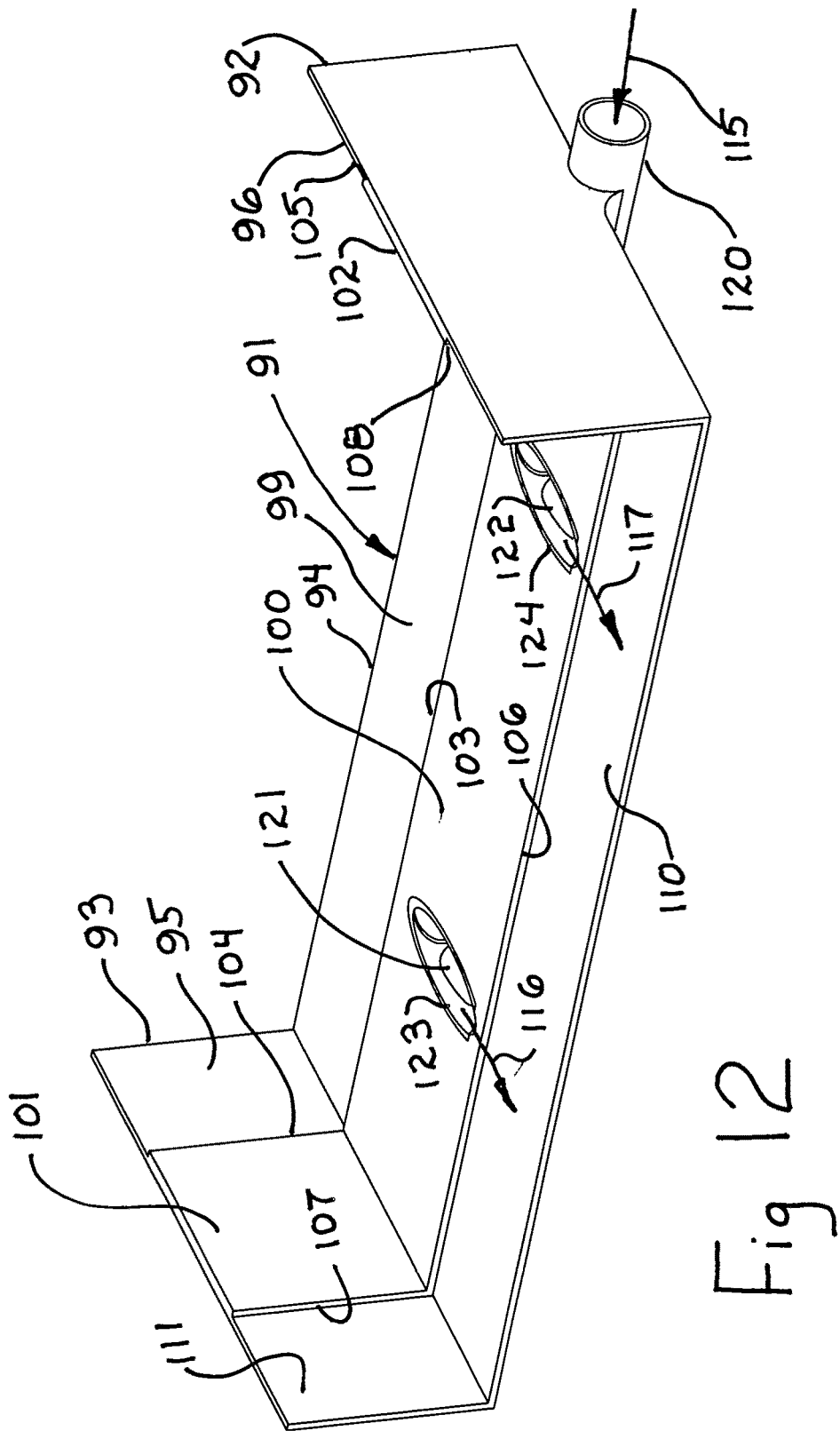
FIG. 12 sets forth a perspective view of a trough junction support utilized in connecting trough sections within the present invention agricultural growing system.

FIG. 12 sets forth a perspective view of a trough junction support constructed in accordance with the present invention and generally referenced by numeral 90. Trough support 90 includes a base 91 having a horizontal crossplate 94 and a pair of upwardly extending sidewalls 92 and 93. Crossplate 94 and sidewalls 92 and 93 form a generally U-shaped base support. Crossplate 94 defines a pair of horizontal surfaces 99 and 100 tan and a raised portion 100 extending therebetween. Similarly, sidewall 93 defines sidewall surfaces 95 and 111 on each side of a raised sidewall portion 101. Sidewall 92 is identical to side-wall 93 and includes sidewall surfaces 96 and 112 on each side of a raised sidewall portion 102. Raised portion 100 defines parallel edges 103 and 106 while raised sidewall portion 101 defines edges 104 and 107. Similarly, raised sidewall portion 102 defines edges 105 and 108. Trough junction support 90 further includes a crosspipe 120 secured upon the underside of cross plate 94. Raised portion 100 defines a pair of elongated apertures 123 and 124. Crosspipe 120 further supports a pair of discharges 121 and 122 (better seen in FIG. 14). In the anticipated operation of the present invention agriculturally growing structure, a plurality of trough junction supports, such as trough junction support 90, are secured to water carrying pipe structures in the manner described above. As is also described above the use of water carrying pipe structures for supporting the helical trough and the pluralities of trough junction supports greatly increases the efficiency of the present invention agricultural growing structure. Accordingly, in the example shown in FIG. 12, the introduction of water flow into crosspipe 120 in the direction indicated by arrow 115 allows discharges 121 and 122 to divert a portion of water flowing through crosspipe 120 upwardly through apertures 123 and 124 respectively thereby producing a water flow within the helical trough (seen in FIG. 17) in the directions indicated by arrows 116 and 117. In this manner, trough junction support 90 performs three concurrent functions within the present invention agricultural growing system. First, crosspipe 120 (as is better seen in FIG. 17) extends between the trough support structure on either side of the trough thereby providing physical support for the trough. Second, crosspipe 120 carries water flow from one side of the pipe support structure to the other forming a portion of the water circulation system. Finally, trough junction support 90 introduces water flow into the helical trough that adds water to the trough and enhances the directional flow of the water within the trough as it carries the floating trays through the helical array.

Figure 13:
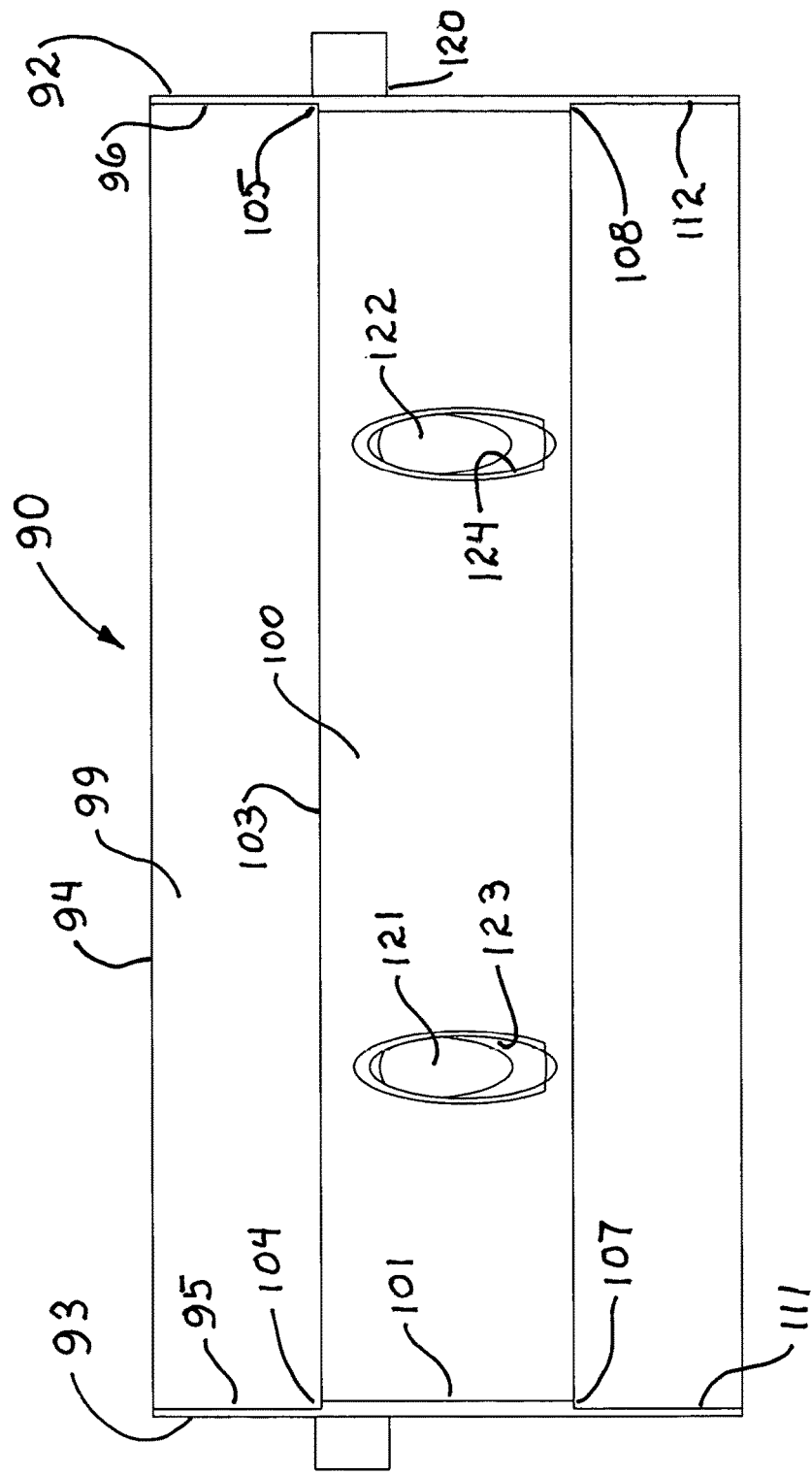
FIG. 13 sets forth a top view of the trough junction support shown in FIG.

FIG. 13 sets forth a top view of trough junction support 90. As described above, trough support 90 includes a base 91 having a horizontal crossplate 94 and a pair of upwardly extending sidewalls 92 and 93. Crossplate 94 and sidewalls 92 and 93 form a generally U-shaped base support. Crossplate 94 defines a pair of horizontal surfaces 99 and 110 and a raised portion 100 extending therebetween. Similarly, sidewall 93 defines sidewall surfaces 95 and 111 on each side of a raised sidewall portion 101. Sidewall 92 is identical to sidewall 93 and includes sidewall surfaces 96 and 112 on each side of a raised sidewall portion 102. Raised portion 100 defines parallel edges 103 and 106 while raised sidewall portion 101 defines edges 104 and 107. Similarly, raised sidewall portion 102 defines edges 105 and 108. Trough junction support 90 further includes a crosspipe 120 secured upon the underside of cross plate 94. Raised portion 100 defines a pair of elongated apertures 123 and 124. Crosspipe 120 further supports a pair of discharges 121 and 122 (better seen in FIG. 14).

Figure 14:
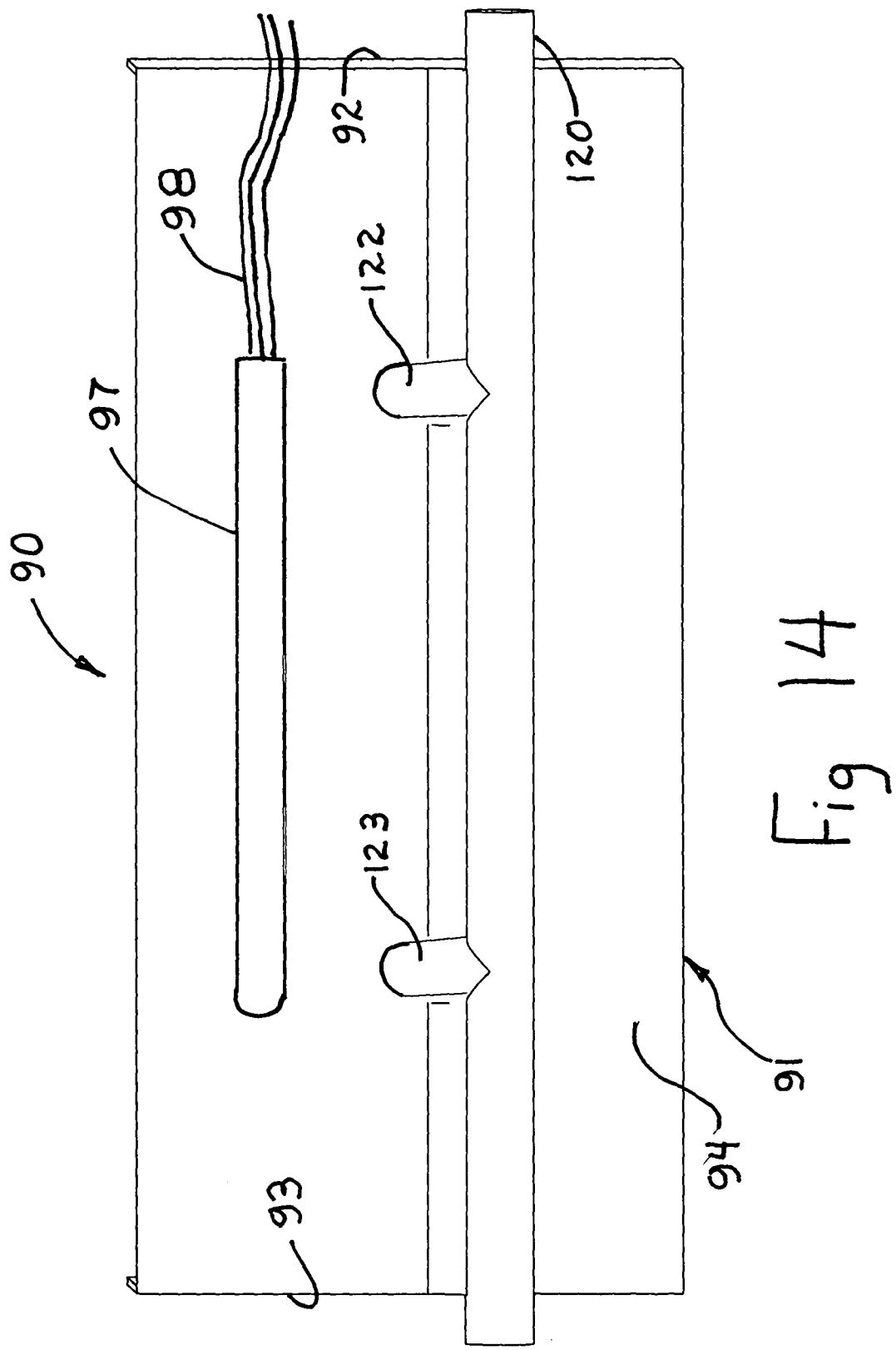
FIG. 14 sets forth a bottom view of the trough junction support shown in FIG. 12.

FIG. 14 sets forth a bottom view of trough junction support 90. Trough junction support 90 includes base 91 having generally planar crossplate 94. Cross plate 94 supports sidewalls 92 and 93. Cross pipe 120 is joined to the bottom surface of crossplate 94 and includes upwardly angled discharges 122 and 123. A supplemental electric light 97 is supported upon the undersurface of plate 94 and is coupled to an external power source (not shown) by coupling wires 98. As mentioned above the present invention system preferably utilizes a plurality of electric lights which are able to provide additional light within the helical array of the agricultural growing structure to supplement the natural light provided and accommodate the vertical stacking of the helical trough structure.

Figure 15:
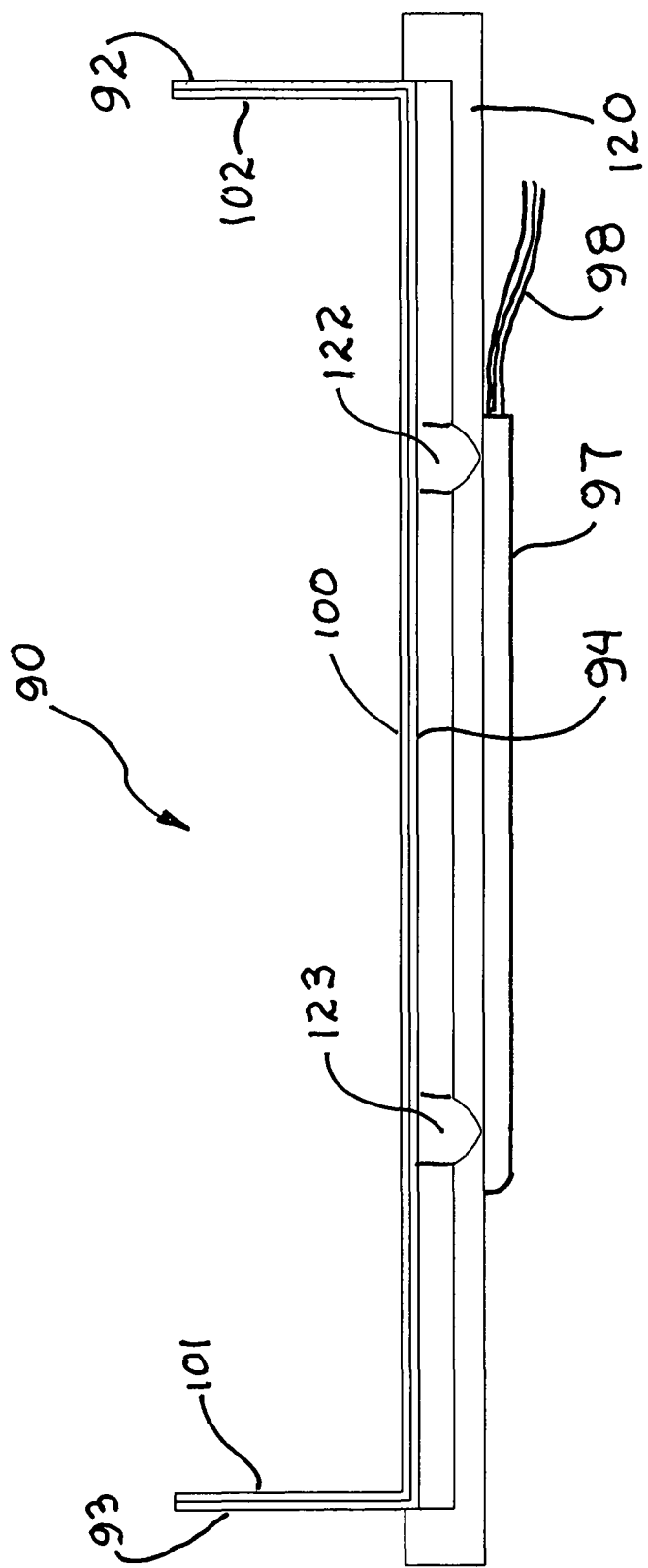
FIG. 15 sets forth an end view of the trough junction support shown in FIG. 12.

FIG. 15 sets forth an end view of trough junction support 90. Trough junction support 90 includes base 91 having generally planar crossplate 94. Crossplate 94 supports sidewalls 92 and 93. Crosspipe 120 is joined to the bottom surface of crossplate 94 and includes upwardly angled discharges 122 and 123. A supplemental electric light 97 is supported upon the undersurface of plate 94 and is coupled to an external power source (not shown) by coupling wires 98. Crossplate 94 further supports a raised portion 100 while sidewalls 92 and 93 support raised portions 102 and 101 respectively.

Figure 16:
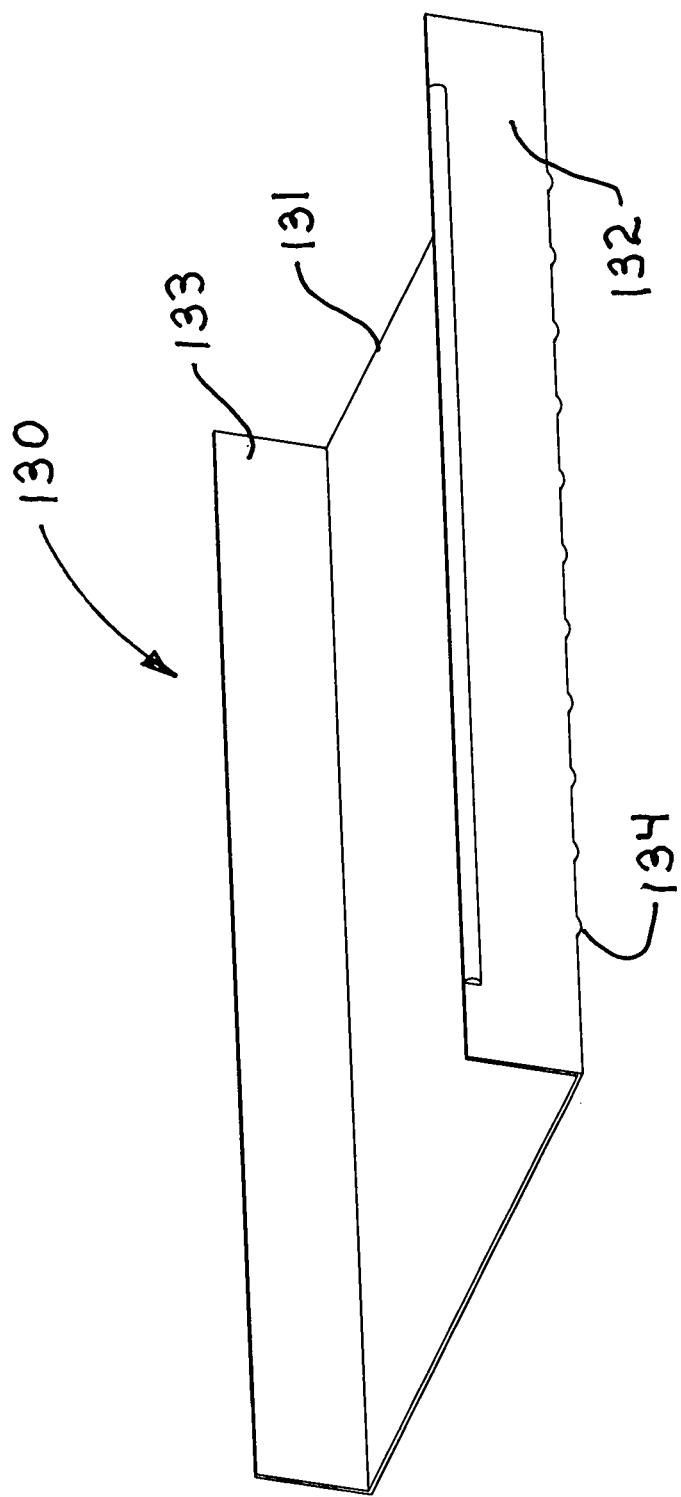
FIG. 16 sets forth a perspective view of an illustrative trough section utilized in the present invention agricultural growing system.

FIG. 16 sets forth a perspective view of an illustrative trough section generally referenced by numeral 130. Trough section 130 will be understood to be generally representative of the plurality of trough sections which are coupled between a corresponding plurality of trough junction supports such as trough junction support 90 shown in FIG. 12 above. It will be apparent to those skilled in the art that the length of trough sections utilized in the present invention helical architectural growing structure is to some extent a matter of design choice. It has been found generally advantageous to utilize trough sections having lengths between four and 6 feet. However, it will be apparent to those skilled in the art that in response to the conditions of operation and other factors, trough sections of different lengths may be utilized without departing from the spirit and scope of the present invention.

Trough section 130 includes a generally planar bottom 131 together with upwardly extending sidewalls 132 and 133. As a result, trough section 130 forms a generally squared U-shaped trough. Trough section 130 further includes a plurality of reinforcing ribs 134 which extend from side to side on the undersurface of bottom 131. Reinforcing ribs 134 are operative to strengthen the trough as it supports a volume of water passing through and supported by the trough.

FIG. 17 sets forth a perspective view of a typical trough junction in which a pair of trough sections are supported by a trough junction support. More specifically, trough junction support 90 includes crossplate 94 which supports upwardly extending sidewalls 92 and 93 Crossplate 94 supports raised portion 100 while sidewalls 92 and 93 support raised portions 102 and 101 respectively. Raised portion 100 defines edges one 103 and 106. Raised portion 102 of sidewall 92 defines edges 105 and 108. Raised portion 101 of sidewall 93 defines edges 104 and 107.

A trough section 140 includes a bottom 139 and a pair of sidewalk 141 and 142. Bottom 139 of trough section 140 defines an edge 143 while sidewalls 141 and 142 define respective edges 144 and 145. A trough section 150 includes a bottom 151 and a pair of sidewalk 152 and 153. Bottom 151 defines an edge 154 while sidewalls 152 and 153 define respective edges 155 and 156. Trough junction support 90 further includes crosspipe 120 joined to the undersurface of crossplate 94. A pair of pipe supports 160 and 161 are shown in phantom line depiction and represent an illustrative trough support structure within which trough junction support 90 is secured. Pipe supports 160 and 161 are coupled to opposed ends of crosspipe 120. In accordance with the preferred fabrication of the present invention, pipe supports 160 and 161 provide the mechanical support for trough junction support 90 while also providing water flow into crosspipe 120.

Trough section 140 is received within one side of trough junction support 90 such that edges 143, 144 and 145 are brought into abutment with edges 103, 104 and 105 of raised portion 100. This abutment of edges ensures that water flowing from trough section 140 across raised portion 100 will flow and not leak. Similarly, the abutment of edges 106, 107 and 108 of raised portion 100 and edges 154, 155 and 156 of trough section 150 provides a leak proof seal for trough section 150. As a result, water flowing through the junction of trough sections 140 and 150 provided by trough junction support 90 flows freely and unimpeded, it will be apparent to those skilled in the art that the resulting structure in which the helical trough of the present invention is formed of multiple trough sections joined by multiple trough junction supports in the manner shown in FIG. 17 provides a continuous controllable water flow which readily carries the floating trays of the present invention hydroponic agricultural system.

What has been shown is an agricultural growing structure that provides a generally planar foundation pad formed of a material such as concrete, or the like, which supports a framework defining a plurality of concentric circular helical paths stacked in a cylindrical array. A plurality of helical water troughs are supported by the framework within each of the circular paths. Water circulation apparatus is provided which pumps water from the bottom of each helical water trough to the top and selected intermediate portions of the water trough to produce a continuous circulation of water. The circulating water is combined with various nutrients and the nutrient and water solution is filtered as it is circulated. Each helical water trough is formed of multiple vertically stacked layers of the trough. As a result, a great length of water trough is stacked upon a small footprint of land. Each water trough is filled with a plurality of floating growing trays to form a continuous "train" of growing trays extending down the entire water trough. As the water and nutrient solution flows down each helical water trough, the floating growing trays are carried down the water trough. As the growing trays move, they are continuously removed from the bottom end of the water trough, harvested, restocked and added back to the top of the helix.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:
1. A hydroponic agricultural growing system comprising:
a supporting surface;
a support structure formed upon said support surface;

a helical growing trough defining a helix top and a helix bottom and a helical water flow trough therebetween, said helical water flow trough being supported by said support structure and having a water flow surface and confining sidewalls on each side of said water flow surface;

a water circulation system collecting water from said helix bottom and recirculating it to said helix top, whereby water flows from said helix top, through said helical water flow trough, to said helix bottom forming a helical water flow;

a plurality of floating growing trays, each defining a growing portion and each constructed to float freely within said helical water flow trough and each floating growing tray being narrow enough to allow it to be carried downwardly within said helical water flow trough under the urging of said helical water flow; and a plurality of growing medium units each supported within one of said floating growing trays, whereby agricultural plants may be grown in said floating growing trays as said floating growing trays traverse said helical growing trough from said helix top to said helix bottom.

2. The hydroponic agricultural growing system set forth in claim 1 wherein said helical water flow trough is formed of a plurality of trough segments.

3. The hydroponic agricultural growing system set forth in claim 2 wherein said helical water flow trough includes a plurality of trough junction supports each interposed between a successive pair of trough segments within said plurality of trough segments.

4. The hydroponic agricultural growing system set forth in claim 3 wherein said plurality of trough junction supports each defines an aperture and wherein said support structure includes a plurality of water flow pipes coupled to said water circulation system and having a plurality of water discharges each water discharge being coupled to one of said apertures in said plurality of trough junction supports.

5. The hydroponic agricultural growing system set forth in claim 3 wherein said plurality of trough junction supports each defines a pair of apertures and wherein said support structure includes a plurality of water flow pipes coupled to said water circulation system and having a plurality of water discharges each water discharge being coupled to one of said apertures in said plurality of trough junction supports.

6. A hydroponic agricultural growing system comprising:
a supporting surface;
a support structure formed upon said support surface;
a first helical growing trough defining a first helix diameter and a first helix top and a first helix bottom and a first helical water flow trough therebetween, said first helical water flow trough being supported by said support structure and having a first water flow surface and first confining sidewalls on each side of said first water flow surface;
a first water circulation system collecting water from said first helix bottom and recirculating it to said first helix top, whereby water flows from said first helix top, through said first helical water flow trough, to said first helix bottom forming a first helical water flow;
a first plurality of floating growing trays, each defining a first growing portion and each constructed to float freely within said first helical water flow trough and each first floating growing tray being narrow enough to allow it to be carried downwardly within said first helical water flow trough under the urging of said first helical water flow;
a first plurality of growing medium units each supported within one of said first floating growing trays;
a second helical growing trough defining a second helix diameter, smaller than said first helix diameter, and a second helix top and a second helix bottom and a second helical water flow trough therebetween, said second helical water flow trough being supported by said support structure inside of and generally concentric with said first helical growing trough and having a second water flow surface and second confining sidewalls on each side of said second water flow surface;
a second water circulation system collecting water from said second helix bottom and recirculating it to said second helix top, whereby water flows from said second helix top, through said second helical water flow trough, to said second helix bottom forming a second helical water flow;
a second plurality of floating growing trays, each defining a second growing portion and each constructed to float freely within said second helical water flow trough and each second floating growing tray being narrow enough to allow it to be carried downwardly within said second helical water flow trough under the urging of said second helical water flow;
a second plurality of growing medium units each supported within one of said second floating growing trays;
whereby agricultural plants may be grown in said first and second floating growing trays as said first and second floating growing trays traverse said first and second helical growing troughs.

7. The hydroponic agricultural growing system set forth in claim 6 wherein said first and second helical water flow troughs are formed of first and second respective pluralities of trough segments.

8. The hydroponic agricultural growing system set forth in claim 7 wherein said first and second helical water flow troughs include first and second pluralities of trough junction supports each interposed between successive pairs of trough segments within said first and second pluralities of trough segments.

9. A hydroponic agricultural growing system comprising:
a helical growing trough defining a trough interior, a trough interior width, an upper end and a lower end;
a support structure for supporting said helical growing trough, said upper end and said lower end;
a liquid recirculation system coupled to said upper end and said lower end providing liquid circulation which travels downwardly from said upper end through said helical growing trough to said lower end and is returned to said upper end;
a plurality of floating growing trays each defining a growing tray width smaller than said trough interior width and each including a plant growth medium suitable for receiving plants and each defining a plurality of apertures through which liquid and plants may combine, said floating growing trays constructed to be received within and travel through said helical growing trough.

10. The hydroponic agricultural growing system set forth in claim 9 wherein said helical growing trough includes a plurality of sequential joined growing trough segments.

11. The hydroponic agricultural growing system set forth in claim 10 wherein said growing trough segments each define a forward end and a rearward end and wherein said helical growing trough includes a plurality of trough junction supports each interposed between a forward end and a rearward end of successive growing trough segments within said plurality of trough segments.

12. The hydroponic agricultural growing system set forth in claim 11 wherein said growing trough segments each define a bottom surface and wherein said hydroponic agricultural growing system further includes a plurality of electric lights supported upon selected ones of said bottom surfaces.

\* \* \* \* \*